United States Patent

Carver

[11] 4,376,416
[45] Mar. 15, 1983

[54] CONVERTIBLE SAILBOAT/MOTORBOAT

[76] Inventor: George P. Carver, 1032 Santiago Dr., Newport Beach, Calif. 92660

[21] Appl. No.: 122,275

[22] Filed: Feb. 19, 1980

[51] Int. Cl.³ .................. B63B 35/00; B63H 9/04
[52] U.S. Cl. .................................. 114/39; 114/140; 114/141; 114/271
[58] Field of Search .............. 114/39, 56, 62, 127, 114/130, 132, 140, 141, 285, 290, 271, 128

[56] References Cited

U.S. PATENT DOCUMENTS

| 2,371,478 | 3/1945 | Steele | 114/271 X |
| 3,415,213 | 12/1968 | Nemetz | 114/56 |
| 3,678,874 | 7/1972 | Flink | 114/285 |
| 3,938,458 | 2/1976 | Irgens | 114/285 |
| 3,990,384 | 11/1976 | Reynolds, III | 114/39 X |
| 4,008,677 | 2/1977 | Wordell, Sr. | 114/162 |
| 4,067,280 | 1/1978 | Serfess | 114/128 |
| 4,161,796 | 7/1979 | Kostanecki | 114/162 X |

Primary Examiner—Richard L. Chiesa
Attorney, Agent, or Firm—Frank Charles Price

[57] ABSTRACT

A convertible sailboat/motorboat is disclosed which has capability for displacement movement under maximum speeds typical of the maximum for displacement boats as a function of their size, capability for semi-planing of the hull under sail propulsion, and capability for planing of the hull under motorboat propulsion. The key features are an extremely light hull weight, an engine located approximately amidships, and a deep retractable keel with an upper trim tab which upon retraction into the hull creates a large shift of center-of-gravity rearward for the boat. The keel is hinged at a point above and to the rear of the keel which imparts a large rear movement of the keel weight for motorboat operation upon its retraction. Performance under displacement sailing is uniquely enhanced with the combination of a low-weight, deep keel and the keel trim tab in the upper portion of the keel where slip reaction is generated with the addition of a minimum of extra heeling moment to that generated by the sails. The very light weight hull and all its appointments permit a high keel/boat weight ratio, a low boatweight/waterline length ratio and a high engine horsepower/boat weight ratio. The hull has flat planes aft. The lightweight hull is made possible by (1) construction of the hull wall of plastic foam sandwiched between two layers of unidirectional fiberglass skins and (2) designing for only 6 psi water pressure during planing.

1 Claim, 9 Drawing Figures

CONVERTIBLE SAILBOAT/MOTORBOAT

References cited in the filing of the Patent

| | | |
|---|---|---|
| 3,938,458 | Irgens | Feb. 17, 1976 |
| 3,678,874 | Flink | July 25, 1972 |
| 3,415,213 | Nemetz | Dec. 12, 1968 |

BACKGROUND

1. Field of the Invention

The present invention relates to a convertible monohull boat which can be made to move through the water in either a displacement mode or a planing mode and particularly to a boat which is thrusted by either sail or engine power in the displacement mode and by either sail or engine power in the planing mode.

2. Description of the Prior Art

Criteria of Speed/Design in Boats

DISPLACEMENT SAILBOATS

Displacement sailboats have a maximum speed in knots which is limited to approximately 1.34 times the square root of the waterline length in feet, $\sqrt{LWL}$. This is due to the wavemaking characteristics of the hull. Maximum speed is limited to the speed where the induced wavelength is equal to the waterline length. Under this condition the addition of more thrust force will only cause the stern to "squat" deeper in the water with negligible increase in speed.

A practical sailboat hull must have sufficient "lateral plane", the hull shape and its keel, to counteract the side forces from the sails as well as have an underwater shape of minimum drag characteristics. A rudder must be provided for steering. The relationship between the center of gravity and the center of bouyancy must be such that a sufficient lateral righting moment is provided to counteract the heeling effect of the sails. A conventional displacement sailboat with the above practical features and of a size having a waterline length of 40 feet will typically have a maximum speed of 8.5 knots.

HIGH SPEED PLANING SAILBOATS

A planing sailboat does not have the speed limitation of a displacement boat. It is capable of higher speeds which can be several times as high as the displacement type for the same length of hull. Table I illustrates the speed limitation of displacement-type boats and the higher speed potential of planing boats. The data are adapted from FIG. 162 in Marchaj's book. C. A. Marchaj, Sailing Theory & Practice, Publisher Dodd, Meede & Co., New York, 1965, p. 266. Table I shows the increasing trend of required sail force with increasing speed. The speed parameter is normalized to boat size. Table I indicates how the displacement boat speed is limited by a rapidly increasing required sail force as the speed parameter increases. Neither extreme winds nor greater sail area would allow much increase in speed after a given speed limit is reached. As indicated in Table I, the planing boat can attain much higher speeds since there is only proportional increases in the corresponding required sail force with increases in speed.

TABLE I

| Sail Force Parameter | Speed Parameter (Normalized to boat waterline length) | |
|---|---|---|
| | Displacement | Planing |
| 25 | 0.80 | 0.70 |
| 40 | 0.88 | 0.88 |
| 50 | 0.96 | 1.1 |
| 100 | 1.1 | 1.4 |
| 200 | 1.3 | 1.8 |
| 400 | 1.4 | 2.9 |
| 600 | 1.41 | 3.8 |

This represents an opportunity for very high speed with adequate wind/sail area. On the other hand, Table I also indicates that the displacement boat performs better than the planing boat at low sail force levels. The generally accepted primary criteria for planing performance is that the displacement/length ratio, defined as the displacement (weight) of the hull in long tons divided by the cube of the waterline length in 100's of feet, shall be less than 140 and the "sail-area-to-displacement ratio", $$\frac{A_s}{(W_{long\ tons})^{\frac{1}{3}}}$$

shall be greater than 280.

MOTORBOATS

Displacement-type motorboats, such as large ships, have the same speed limitation mentioned for displacement sailboats above. However, most small, fast motorboats are of the planing type which can reach speeds of over 10 times the square root of the waterline length if sufficient engine thrust power is applied. The criteria which enhance planing compared to displacement are: (1) broader flat sections aft with minimized curvature; (2) a center of gravity location which is much farther aft; (3) lighter weight; (4) increased power.

PLANING SAILBOATS

Planing sailboats are designed to operate at much higher speeds than displacement sailboats. A planing sailboat will have the following features: (1) very light weight in the hull structure and in all the systems it carries on board; (2) a mast and rigging of low drag; (3) a hull with low drag and with flat surfaces aft. The planing sailboat must have a displacement/length ratio below 140, ie, $$\frac{\text{Weight}_{long\ tons}}{(\text{Water Line Length}, ft/100)^3} \leq 140.$$

A conventional six-meter displacement sailboat which is not designed for planing has a displacement/length ratio of 340. A "Flying Fifteen" planing dinghy with keel has a ratio of 132 and can readily reach a speed in knots of $3.1 \times \sqrt{LWL}$.

Sail area/displacement, $$\frac{A_s}{(WLT)^{\frac{1}{3}}},$$

is also a criteria for planing. Nominally this should be above 280; although, the "Flying Fifteen" planes with a value of 256. Planing will begin for a properly designed hull when the driving force of the sails is 8–10% of the displacement, according to Marchaj. Sailpowered, planing keel boats, such as "Black Soo", meeting the above criteria, have recorded speeds up to $4.2\sqrt{LWL}$. This is mentioned in "The Science of Yachts, Wind and Water" by H. F. Kay, John Van D'Graff Inc., Tuckahoe, N.Y.

THE CONVERTIBLE DISPLACEMENT/PLANING, SAIL/ENGINE BOAT

The concept of a displacement sailboat which operates alternatively as a planing sailboat or as a planing power boat has always been assumed to have serious drawbacks. The result, has been expected to be either a sailboat of poor performance or an engine-powered boat of poor performance or both. A powerful engine for motor planing adds weight which slows the sailing speed below planing speed. The engine and design for a planing powerboat have always precluded sail-thrusted planing. The propellers can create much drag during sailing. The keel and rudder, required for sail-thrusted operation, both become large drag factors under high speed, engine-thrusted operation. In order to obtain, under sail thrust or engine thrust, a speed significantly above that of a sail-thrusted, displacement mode, the boat must be made to plane. Normally, a hull shape which at high speeds will plane, will have poor characteristics under the slower displacement speed. A conventional mono-hull design of good displacement sailing characteristics will not normally be able to exceed its maximum sailing speed simply by incorporating a powerful engine and propeller. Planing sailboats are produced which have very little or no engine power. Planing sailboats become displacement sailing boats at low speed. In conjunction with this, such sailboats can have a swing keel or centerboard to drop for improved low-speed displacement sailing. Such boats are small, bare designs with little or no engine to facilitate power planing.

SUMMARY OF THE PRESENT INVENTION

According to the present invention a boat design is provided to perform both as a conventional displacement sailboat and as a planing boat either under sail or engine power. In accordance with the invention, the convertible sailboat/motorboat has a unique versatility: good performance in four operating modes, displacement motorboat, displacement sailboat, planing sailboat, and planing motorboat. The key to this versatility lies in the combination of the hull design, the keel design, the engine placement and several conversion steps.

The keel retracts aft on a specially located pivot into a sealed well to create a large aft movement of the keel weight. The retracted keel adjusts the center of gravity of the boat to an aft location to allow the planing of the hull.

The keel is deep and narrow with an upper trim tab. With this shape its function is achieved with minimum weight addition to the boat. The trim tab allows the development of minimum tipping moment while the trim tab functions to preclude hull slip. The hull configuration develops straight water flow lines while planing under power. The butt lines are convex to the aft bottom for displacement sailing performance. The aft bottom has low deadrise for lateral stability under sail. This provides a dry hull section for planing under power. The propulsion system consists of one or more outdrive (I/O) units at the stern. An I/O is driven by the engine through a long extension drive shaft which allows placement of the engines approximately amidships. This placement is optimum for displacement sailing as it helps establish the center-of-gravity of the boat close to amidship. The I/O unit provides steering under engine power. It is retracted to a dry position during sailing in order to eliminate its water drag.

Thus, in accordance with the invention, a boat is presented having a unique versatility. The features which create this versatility are incorporated in forms to allow the hull performance in one operating mode while at the same time having flexibility or characteristics to accommodate the other operating modes.

DESCRIPTION OF THE PREFERRED EMBODIMENT

Figure 1:
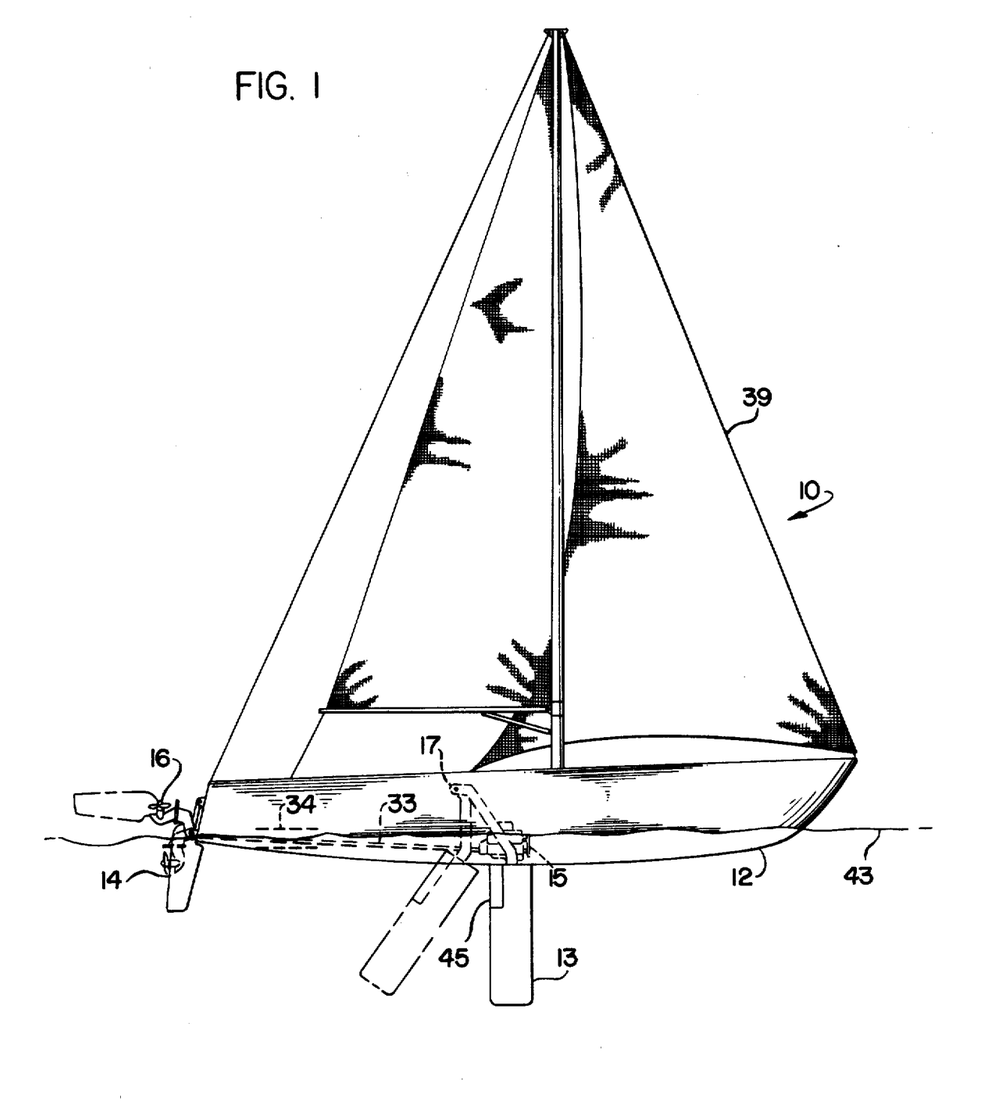
FIG. 1 is an elevation view in diagrammatic form illustrating the present convertible sailboat/motorboat in its configuration for displacement sailing operation.

Referring now to the drawings, there is illustrated in FIG. 1 a convertible monohull boat 10. The convertible sailboat/motorboat comprises generally a hull 12, a keel 13, a rudder 14, an engine 15, a propeller 16, a keel swing mechanism 17, and a keel trim tab 45. These major parts of the boat and their associated parts make up the present invention. It can be assumed that other components such as the sails, the cabin, the galley, the furniture and the helm, as are commonly found on sailboats or motor boats, would also be part of a boat which is designed to the present invention. An important part of the feasibility of the present invention is that all components of the boat are made as light weight as possible. The keel 13 is designed to weigh between 20 and 40% of the total weight of the boat. High speed sailboats have keel weights of 40 to 60% of the total weight.

In FIG. 1 the convertible boat 10 is shown arranged for displacement sailing operation. The keel 13 is straight down, the rudder 14 is operative and the propeller 16 is out of the water. In this arrangement the boat 10 is unusually stable with the engine 15 located near the longitudinal center of the hull 12. The dotted lines for the keel 13 on FIG. 1 show how the boat 10 is arranged for planing sailboat operation. The keel 13 can be swung up entirely out of the water 43. FIG. 1 shows the keel 13 swung partially rearward. This position of the keel or a position near it can be used in sailing downwind or in motorboat operation in calm water or with low cross winds.

Figure 2:
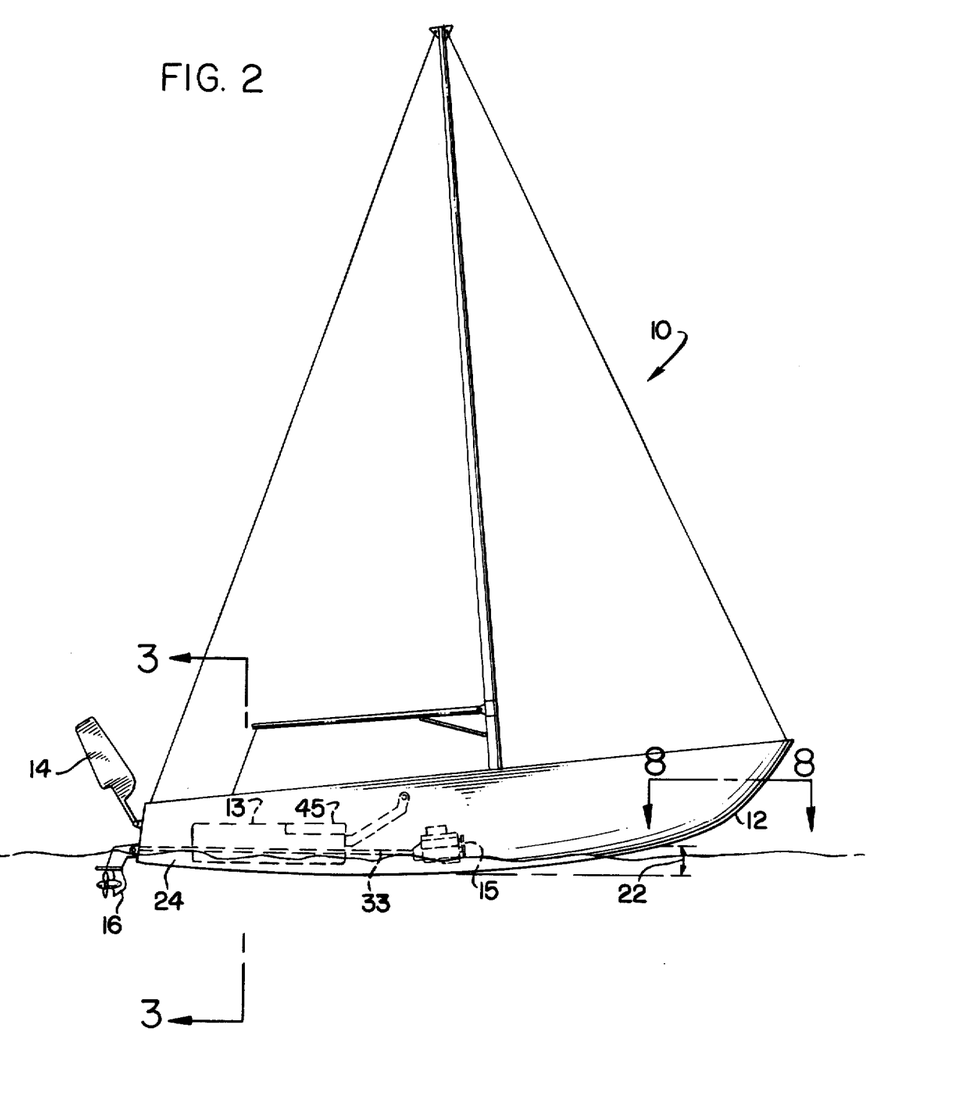
FIG. 2 is an elevation in diagrammatic form illustrating the present boat in its motorboat configuration for motorboat planing operation.

In FIG. 2 the convertible boat 10 is shown arranged for motorboat planing operation. The rudder 14 is retracted from the water and the keel 13 is swung entirely into the hull. The propeller 16 is in the water. The center of gravity of the boat has been moved rearward with the keel 13 swung up and back into the hull 12. The sails are down and stowed. The hull 12 is riding on its rear planing surfaces 24, see FIG. 4 and FIG. 5. The forward portion of the hull 12 is out of the water 43.

Figure 3:
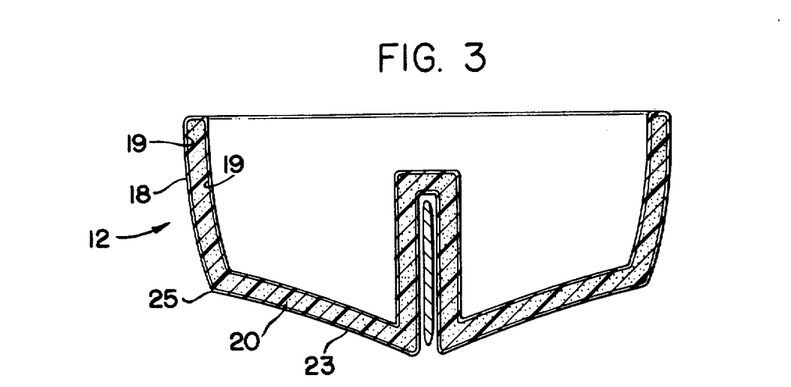
FIG. 3 is a hull cross section near the stern.

The detailed workings of the key components of the boat are now described by referring to the drawings. The cross section of the hull 12 shown in FIG. 3 illustrates the hull wall 18. This wall is made up of three layers, two outside layers of unidirectional fiberglass 19 plus one inner layer of plastic foam 20. This construction forms a very low weight hull 12 of adequate strength. Extremely low weight for the hull structure and all systems is mandatory to allow planing under sail. A low-weight hull 12 is additionally made possible by a new approach to calculations of the required hull strength. The traditional "rule of thumb" analysis methods used in boat design are not applicable for this type of structure. The structural loadings must be calculated specifically for this type of boat. For example, the well-known naval architects, Gibb and Cox of New York use a water pressure of 15 psi as a design value for the bottom of planing motorboats @ 30 mph. For this light weight boat one can calculate a pressure of 5.5 psi using a safety factor of 4, a maximum acceleration of 2.5, a center of gravity distance from the stern of 14 feet, a beam of 10 feet and a weight of 11,000 lbs. as follows:

$$\frac{11,000}{10 \times 14} \times 2.5 \times 4 = 786 \text{ lb/ft}^2 = 5.5 \text{ psi}$$

Figure 4:
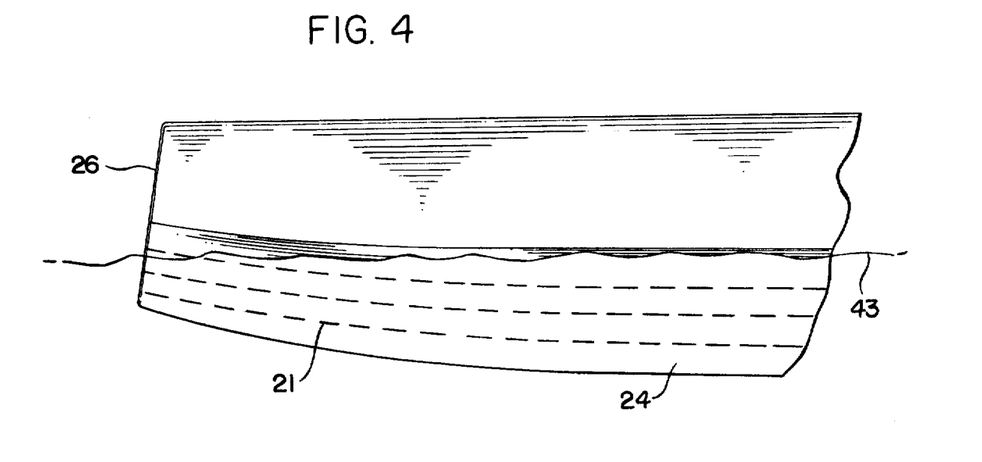
FIG. 4 is a side view of the aft portion of the hull in diagrammatic form illustrating the convex butt lines.
Figure 5:
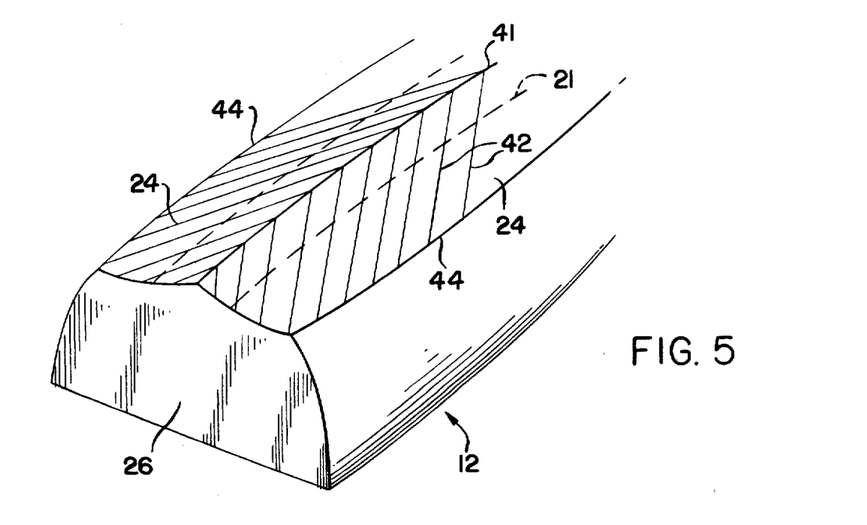
FIG. 5 is a bottom isometric view of the stern portion illustrating how the hull bottom shape is formed.

The rear-bottom slope of the hull 12 slopes upward sharply aft as seen in FIG. 4 in order for most of the transom 26 to ride out of the water during displacement sailing. The shape is one having, as seen in FIG. 5, convex buttlines 21 to the aft bottom. Conventional naval architecture design of planing hulls avoids convex buttlines on the basis that with parallel water flow such buttlines cause a suction which increases drag. In the hull shape of the present invention the water does not flow exactly parallel to the hull centerline when planing. Instead the water has an outboard component of flow due to the "V" bottom 23. FIG. 3, being forced down at the operating trim angle 22, FIG. 2. This downward force of the "V" bottom 23 forces the water flow outward laterally from the hull 12. This outflow velocity can be calculated as follows:

$$\text{Outflow Velocity} = \frac{\text{boat velocity} \times \text{tangent of trim angle}}{\text{Flat deadrise angle}}$$

The outflow velocity and the boat velocity can be combined to calculate an outflow angle. The outflow angle of the example design is calculated to be 19°. However, tests made using a model with a transparent bottom and string tufts show that the actual angle is approximately one half that calculated for a flat deadrise angle. Therefore, the hull shape of the present invention is developed to minimize this outflow and thus to enhance straight flow lines. The rear hull bottom is a shape which is described as having concave shape 23, FIG. 3, on cross sections made by a vertical plane perpendicular to the boat axis and having convex buttlines 21, FIG. 4.

FIG. 5, an isometric view of the rear portion of the bottom of the hull, demonstrates how such a shape can be developed with a string figure. The string figure or bottom surface 24 of the hull 12 is formed by connecting the hull centerline 41 to the chimes 44 with strings 42 which are parallel to the outflow angle. The resulting bottom surface 24 so formed will have concave cross sections as shown in FIG. 3. Although planing boats have been built with concave cross sections, they generally use straight buttlines. Their concavity is applied to improve riding qualities rather than to straighten the flowlines from a bottom having convex buttlines.

Figure 8:
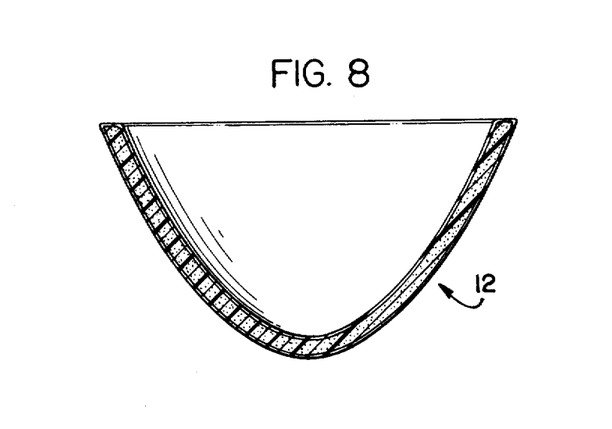
FIG. 8 is a cross section of the forward hull in diagrammatic form illustrating the rounded shape.

FIG. 8 illustrates an example horizontal cross section of the front of the hull 12. The shape is rounded to minimize water and air drag especially at high speed or when the hull 12 moves against the wind. In FIG. 4 the hard chime 25 is illustrated with low deadrise to enhance lateral stability under sail.

Figure 9:
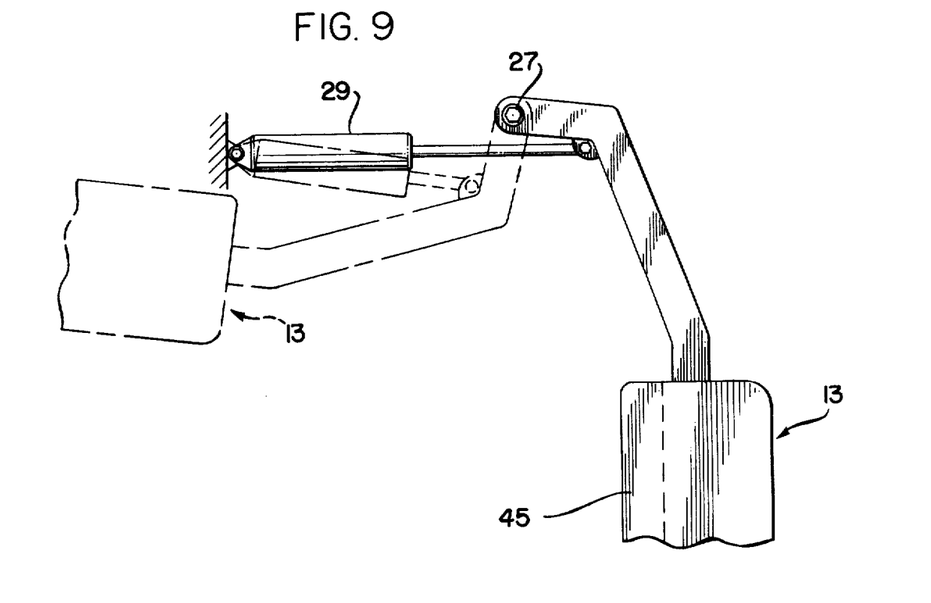
FIG. 9 is a side view in diagrammatic form illustrating the keel retraction mechanism.

FIG. 9 illustrates in a side view the movable keel 13 and its retracting mechanism 17. The keel 13 has a high aspect ratio $$= \frac{\text{chord}}{2 \times \text{depth}},$$

which can range between 3 and 10. The weight of the keel 13 ranges between 20% and 40% of the total boat 10 weight. This large keel/total boat weight ratio, along with the engine 15 being located near the center of the hull 12 length, provides for the boat 10 a low moment of inertia about the lateral axis of the hull 12 which is desirable for displacement motion through waves. The keel trim tab 45 is controlled from the helm by means of a wheel which is concentric with the steering wheel. The trim tab 45 creates a force against the hull 12 to react against the sail forces which tend to cause the hull 12 and keel 13 to side-slip. The trim tab 45 does this with less drag than would the slip action of the hull 12 and keel 13. The length of the trim tab 45 is 10 to 30% of the vertical length of the keel 13. With the trim tab 45 incorporated into the keel 13 adjacent to the hull 12, the moments created by the trim tab 45, which add to the moments generated by the sails 39 and which must be taken out by the remainder of the keel 13, are minimized. Thus, the size and weight of the keel 13 is minimized. The keel retraction is designed with the retraction mechanism 29, FIG. 9 and pivot 27 placed approximately 4 feet above the hull bottom and approximately the same distance aft of the midpoint of the keel 13 in its down position. Thus, a large aft movement of the keel 13 and its weight is achieved when the keel 13 is retracted. The hydraulic actuator 29 swings the keel 13 up and back or down and forward. The keel 13 position can be held in any intermediate position.

Figure 6:
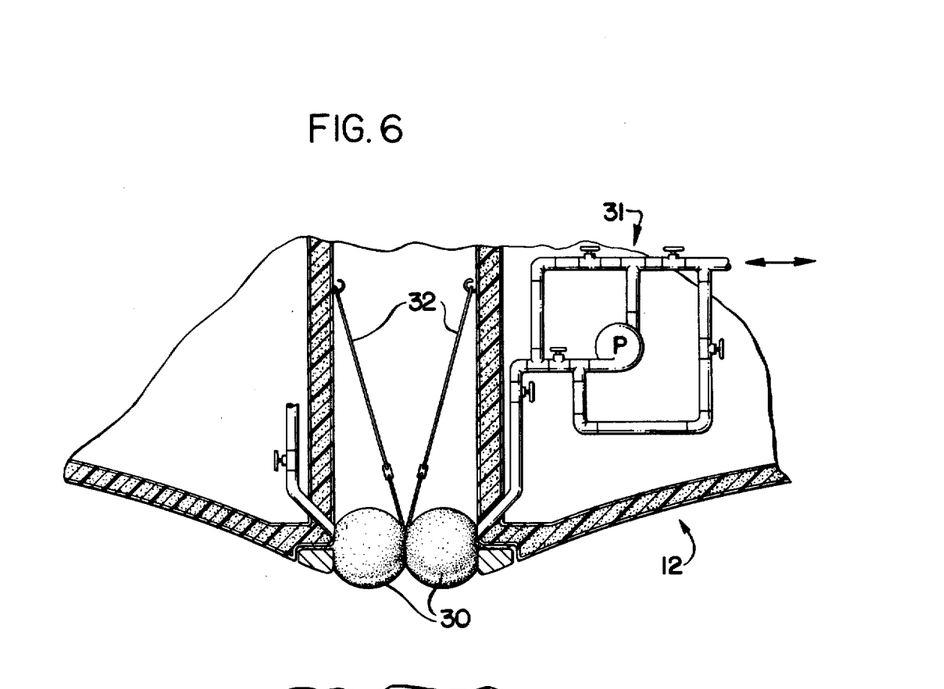
FIG. 6 is a hull cross section through the keel slot illustrating the keel slot cover inflated and closed.
Figure 7:
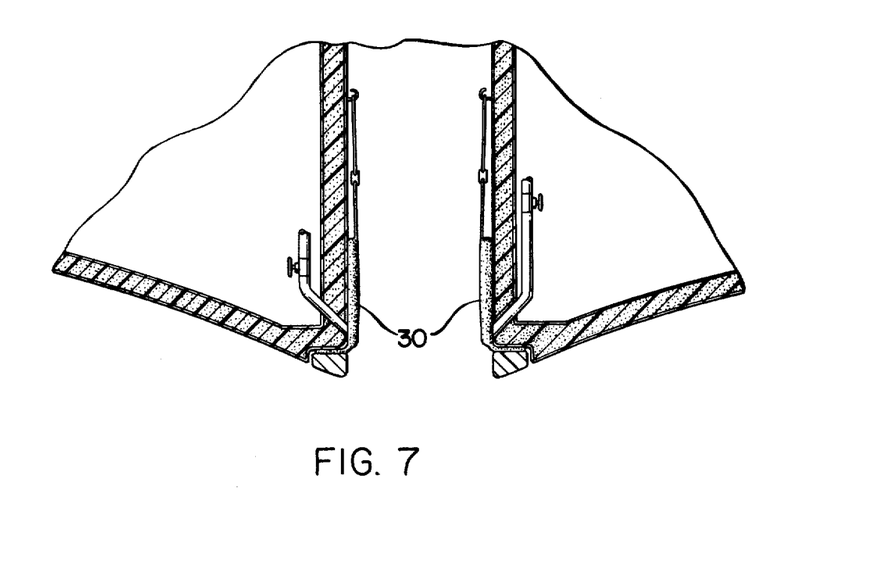
FIG. 7 illustrates the keel slot cover deflated and open.

The keel slot cover 30 is illustrated in FIG. 6 in its inflated position. The cover 30 seals off the slot when the keel 13 position is stationary. The cover 30 is made of elastomeric material in a double hollow tube configuration. Water is pumped into the cover 30 in inflate it and seal the slot to reduce drag due to water circulation in the slot. The deflated, open cover 30 is shown in FIG. 7. A water pumping system 31, which actuates the cover, is provided. As the cover 30 is deflated it is pulled upward and against the wall of the slot by stretch cords 32.

The boat 10 has one or more propellers 16 mounted at the transom 26 and driven by a long shaft 33 which reaches to the approximate center of the hull where the engine 15 is installed. The propeller 16 is of the inboard/outdrive type with provision to be rotated for steering and to be retracted from the water when the boat is under sail. The extension drive shaft 33 connecting the engine 15 to the propeller 16 is contained within a tube 34 which supports the drive shaft. Not shown in the shaft design is a commonly used soft coupling from engine to shaft which precludes vibration and a spline drive which allows axial movement.

The inboard/outboard unit which contains the propeller 16 provides steering during engine-powered propulsion. During sail-driven propulsion the rudder 14 provides steering. The rudder 14 is hinged to swing upward and out of the water during engine operation by an hydraulic mechanism similar to the mechanism used for keel movement.

Thus, a unique convertible boat is described which has a combination of design factors to allow conventional displacement sailing, planing under sail with keel down, hull planing under sail, and hull planing under propeller-driven engine power. The concept of the boat accommodates all the design factors for a convertible boat: the center of gravity can be shifted; the keel can be lifted; the hull is light weight; the rear portion of the hull is shaped for efficient planing; the forward shape has low wind and water resistance.

In the planing mode under sail, the boat is configured either the same as for displacement sailing or with the keel 13 retracted to an intermediate position as shown in FIG. 1. In going from sail planing to propeller planing the rudder is lifted; the propellers do the steering; the sails are furled or taken down from the rigging which is streamlined. The keel slot is covered to minimize drag when the keel is fully retracted or dropped.

In going from motor planing to displacement sailing or sail planing the center of gravity is moved forward by swinging the keel down and forward. The engine is already located in a good forward position. The hull shape at the stern provides a nearly dry transom.

The boat of the present invention is further described by way of the example design presented in Table II. It will be apparent that the present invention can be applied with equal success with boats of smaller or larger sizes than that of the example design.

The following engineering analysis of the example design of the convertible boat demonstrates that the uniquely-wide performance characteristics are feasible. Using the power performance calculation of Stoltz, Koebel and Beinert, the engine horsepower requirement for the planing speed of 32 mph or 27.8 knots can be calculated as follows:

$$\text{The trim angle} = \frac{25 \text{ weight}}{(\text{velocity mph} \times \text{aft beam ft})^2} + \frac{\text{Deadrise angle}}{15}$$

$$= \frac{25 \times 11,000}{(32 \times 10)^2} + \frac{10}{15} = 3.36°$$

$$\text{Friction Drag} = \frac{(\text{velocity} \times \text{beam})^2}{100} = \frac{32^2 \times 10^2}{100} = 1024 \text{ lbs.}$$

$$\text{Wave Drag} = \text{trim angle} \times 1.75 \times \frac{\text{weight}}{100}$$

$$= 3.36 \times 1.75 \times \frac{11,000}{100} = 647 \text{ lbs.}$$

Total Drag = 1671
Power required = 0.53% × Drag × Velocity

-continued
$$= 0.53\% \times 1671 \times 32 = 283 \text{ h.p.}$$
Horsepower for rigging drag at 27.8 knots is estimated to be 27
Total Horsepower = 283 + 27 = 310 hp The example design has 340 hp installed. This performance has been independently verified by the method of Savitsky. For the example design the displacement-/length ratio is:

$$\frac{\text{Wt. long tons}}{(LWL/100)^3} = \frac{4.91}{(40/100)^3} = 77$$

This is well below the maximum criteria of 140. The sail area/displacement ratio for the example design is $$\frac{1050}{(4.91)^{\frac{2}{3}}} = 363$$

which is well above the minimum criteria of 280.

A wind developing 1100 lbs. sail thrust or 10% of the displacement, will support the beginning of hull planing in the example design. Marchaj's "Sailing Theory and Practice" uses the following equation to calculate sail thrust from wind speed:

$$\text{Thrust} = \frac{1}{2} ? V^2 A_S C_R$$
$$? = 0.00238$$
$$C_R = \text{sail coefficient} = 1.2$$

Using a thrust of 1100 lbs. the above equation indicates that a wind velocity, V, of 27.1 ft/sec or 18.5 mph or 16.1 knots is required to begin planing in the example design.

In its planing configuration the example design has a similarity to other planing sailboats having a planing velocity in knots which is $4.2\sqrt{LWL}$.

Thus, by similarity the example design boat with adequate wind will reach a speed in planing of $$4.2\sqrt{40} = 26.6 \text{ knots}$$

While the maximum speed of the example design, as a conventional monohull displacement boat, is 8.5 knots, the above calculations demonstrate that the subject invention describes a displacement sailing boat which has the capability alternatively to sail at more than twice this speed, the 8.5 knots being common to the state-of-art for such displacement boats.

TABLE II

| Example Design | |
|---|---|
| Length, overall, LOA, ft. | 47 |
| Length, waterline, LWL, ft. | 40 |
| Displacement, W, Lbs - long tons | 11,000 - 4.91 |
| Beam, aft bottom, b ft. | 10 |
| Sail area (150% jib), SA, ft.² | 1050 |
| Engine Horsepower power, HP | 340 |
| Keel | |
| Weight, lbs. | 3300 |
| Length, ft. | 10 |
| Cord, ft. | 2.5 |
| Trim tab | |
| length, ft. | 3.0 |
| cord, ft. | 0.75 |
| Center of Gravity, CG, dist. from stern | |
| sail configuration, ft. | 19 |
| motor configuration, ft. | 14 |
| Deadrise angle, DA, degrees | 10 |
| Flotation, lbs. | 13,000 |
| Net unsinkable buoyancy | 2,000 |
| Power performance | |

TABLE II-continued

| Example Design | |
| --- | --- |
| Speed, knots | 28 |
| Req. engine horsepower | 310 |
| Trim angle, degrees | 3.4 |
| Drag, lbs. | |
| friction | 1024 |
| wave | 647 |
| rigging | 160 |

I claim:

1. A monohull boat for operation as a displacement boat and convertible to operation as a planing boat including sails, a mainsail boom, an engine, a keel with a pivot for rotation from a downward-forward position to an upward-rearward position, the improvement comprising:

an adjustable boat hull keel separate and independent from the mainsail boom, the keel having a length between 10% and 30% of the boat waterline length, a ratio of keel weight to total boat weight between 0.2 and 0.4 and a boat displacement/length ratio less than 140, the keel having an aspect ratio between 5 and 10, the keel pivot being located to the rear of the position of the major axis of the fully downwardly-located keel a distance which is more than 30% of the length of the keel and above the keel-hull intersection line a vertical distance which is more than 30% of the length of the keel, a means for moving the keel about the pivot to various positions and in the extreme far enough for the keel to be rearwardly located essentially inside the hull, the elevated and rearwardly placed pivot in combination with the high keel aspect ratio of 5 to 10 and the ratio of keel weight to total boat weight affecting with full keel pivoting rearward a rearward movement of the total boat center-of-gravity 10% to 20% of the hull water line length while the center-of-gravity of the keel is moved rearward 20% to 45% of the water line length of the boat, the fully rearwardly pivoted keel swinging essentially inside the hull providing essentially zero keel drag force against the speed of the boat in the water, the keel including a trim tab portion comprising a trim tab being located in the upper 20% to 40% of the keel length, the trim tab being adjusted separately and independently with respect to the mainsail boom, to balance the lateral force against the sailboat created by the sails' reaction to the wind, the location of the trim tab in the upper keel portion in combination with the keel aspect ratio greater than 5 providing keel functioning with minimized boat keeling moment and maximized hydrodynamic efficiency, the fully-rearwardly keel position in combination with adequate engine horsepower and thrust providing the hull to achieve power planing speed, the adequate thrust in combination with the keel position adjustment, the keel pivot position and the keel high aspect ratio providing a convertible boat.

* * * * *